US006864833B2

(12) United States Patent
Lyon

(10) Patent No.: US 6,864,833 B2
(45) Date of Patent: Mar. 8, 2005

(54) TIME-BASE GENERATOR WITH SELF-COMPENSATING CONTROL LOOP

(75) Inventor: Quinton Lyon, Peterborough (CA)

(73) Assignee: Siemens Milltronics Process Instruments, Inc., Peterborough (CA)

( * ) Notice: Subject to any disclaimer, the term of this patent is extended or adjusted under 35 U.S.C. 154(b) by 0 days.

(21) Appl. No.: 10/683,198

(22) Filed: Oct. 10, 2003

(65) Prior Publication Data

US 2004/0201516 A1 Oct. 14, 2004

(30) Foreign Application Priority Data

Apr. 11, 2003  (CA) .............................................. 2425250

(51) Int. Cl.[7] ............................ G10S 13/08; G10S 7/40
(52) U.S. Cl. ..................... 342/124; 342/174; 342/175; 342/195
(58) Field of Search ................................ 342/118, 120, 342/123, 124, 134, 135, 165, 173, 174, 175, 195, 200–204

(56) References Cited

U.S. PATENT DOCUMENTS

| | | | | | |
|---|---|---|---|---|---|
| 2,854,662 | A | * | 9/1958 | Westwood | 342/95 |
| 3,108,272 | A | * | 10/1963 | Sweeney | 342/176 |
| 3,370,228 | A | * | 2/1968 | Mills | 368/120 |
| 3,613,094 | A | * | 10/1971 | Giles | 342/202 |
| 3,868,687 | A | * | 2/1975 | Goldman et al. | 342/134 |
| 6,466,168 | B1 | * | 10/2002 | McEwan | 342/465 |
| 6,535,161 | B1 | * | 3/2003 | McEwan | 342/124 |
| 6,621,767 | B1 | * | 9/2003 | Kattan | 368/113 |
| 2002/0168003 | A1 | * | 11/2002 | Richards | 375/239 |
| 2002/0176511 | A1 | * | 11/2002 | Fullerton et al. | 375/285 |
| 2003/0025631 | A1 | * | 2/2003 | Kim | 342/198 |
| 2003/0095609 | A1 | * | 5/2003 | Cowie et al. | 375/316 |

OTHER PUBLICATIONS

"A sub–millimeter accurate microwave multilevel gauging system for liquids in tanks", Weiss, M.; Knochel, R.;Microwave Theory and Techniques, IEEE Transactions on , vol.: 49 , Issue: 2 , Feb. 2001 pp.: 381–384.*

"Novel methods of measuring impurity levels in liquid tanks", Weiss, M.; Knochel, R.;Microwave Symposium Digest, 1997., IEEMTT–S International , vol.: 3 , Jun. 8–13, 1997 pp.: 1651–1654 vol. 3.*

\* cited by examiner

Primary Examiner—John B. Sotomayor
(74) Attorney, Agent, or Firm—Workman Nydegger

(57) ABSTRACT

A time-base generator with a self-compensating control loop. The time-base generator is suitable for use in level measurement and time-of-flight ranging systems. The time-base generator includes a pulse generator stage, a delay stage, a control loop and a references voltage module. The pulse generator generates a transmit pulse train and a receive or sampling pulse train with a delayed timing relationship. The control loop functions with the delay stage to maintain the desired delay between the first pulse train and the second pulse train. According to another aspect, the time-base generator includes a calibration module. The calibration module generates calibration pulses which are used by the controller in the level measurement system to calibrate operation.

12 Claims, 6 Drawing Sheets

TIME-BASE GENERATOR WITH SELF-COMPENSATING CONTROL LOOP

RELATED APPLICATION

This application claims the benefit under 35 U.S.C. § 119 of foreign patent application Ser. No. 2,245,250 filed on Apr. 11, 2003 in Canada, which is incorporated herein by reference.

FIELD OF THE INVENTION

The present invention relates to level measurement and time of flight ranging systems, and more particularly to a time-base generator with a compensating control loop suitable for use in level measurement and time of flight ranging systems.

BACKGROUND OF THE INVENTION

Time of flight ranging systems are commonly used in level measurement applications, and are referred to as level measurement systems level measurement systems determine the distance to a reflector (I.e. reflective surface) by measuring how long after transmission of a burst of energy pulses, an echo is received. Such systems typically utilize ultrasonic pulses, pulse radar signals, or microwave energy signals.

Pulsed radar and microwave-based level measurement systems are used over ultrasonic-based systems in many applications because of their improved resolution and minimized susceptibility to outside interference. As compared to ultrasonic pulse systems, radar pulse systems by their very nature deal with high frequency signals and pulse widths in the nanosecond range. To accurately and reliably process these high frequency signals using electronic circuitry, various techniques are employed.

Equivalent time sampling is one such technique. In an equivalent time sampling system, it is possible to process signals that are beyond the frequency range of conventional data acquisition systems provided the signals are repetitive. The signal needs to be repetitive because only one part of the real time signal is measured in every cycle. The portion of the signal which is sampled every cycle can be random, but then the sample needs to be stored in memory so that the whole cycle can be reconstructed after enough samples have been acquired. If the repetitive signal is sampled at a frequency which is slightly less than the repetition frequency, the samples will slowly progress along the length or span of the signal and the reconstruction can take place without storage except for the period between the samples and this can be done using a capacitor. This is further illustrated in FIG. 4, where a single cycle 401 of a repetitive waveform 400 is reconstructed as a waveform 402 by sampling the repeated waveform 400 over a number of cycles. The repetitive waveform 400 is generated by a transmit pulse signal or clock 404 and the waveform 400 is sampled by a sample clock 406 which has a frequency slightly less than the transmit clock 404.

In a radar-based level measurement system, a transmit pulse is coupled to a transducer (i.e. an antenna) to output a radar pulse. The radar pulse is reflected by a reflecting surface and the resulting echo pulse (i.e. reflected pulse) is coupled by the antenna and converted into a receive pulse for further processing by a receiver module in the level measurement system. The receiver module includes a sampling circuit which performs equivalent time sampling. As described above, the equivalent time sampling technique involves sampling the receive signal within a narrow time window. The time window is slewed back and forth by a ramp generator to search for detectable portions of the reflected pulse. The ramp generator sweeps the time window so that the sampled signal can be reconstructed. The exact delay of the receive or echo pulse from the transmit pulse that produces a detectable reflection is a measure of the distance to the reflecting surface.

The accuracy of equivalent time sampling depends in large part on accurately controlling the delay between the two clocks, i.e. the transmit timing pulse signal (the pulse train 404 in FIG. 4) and the receive timing pulse signal (the pulse train 406 in FIG. 4). Known approaches for controlling the timing fall into two general categories. The first approach relies on the use of phase locked loop (PLL) circuitry to accurately control the delay between the two signals. The second approach relies on the use of a delay circuit with closed loop control.

For a phase locked loop implementation, the accuracy of the system depends on the accuracy and temperature stability of the PLL components utilized in the system. In practical systems, this means the use of precise and often expensive PLL components.

The closed loop control of the delay between the two clocks reduces errors, however, there will be electronic components which are outside the control loop, in particular, the reference or control voltage for the ramp generator. The output of the ramp generator is a ramp signal which sweeps the time delay window for sampling the receive pulse. If the linearity or rate of change (i.e. slope) of the ramp signal changes, then the apparent velocity of the equivalent time signal would also change and the result would be incorrect distance readings.

Accordingly, there remains a need for a time-base generator with a compensating control loop which reduces the effects of temperature and time variances while providing a practical design for implementation and manufacturability.

BRIEF SUMMARY OF THE INVENTION

The present invention provides a time-base generator with a compensating control loop suitable for performing equivalent time sampling in time-of-flight or level measurement systems. In another aspect, the present invention provides a calibration mechanism for the time-base generator.

In one aspect, the compensating control loop reduces the effects of temperature dependence on the reference control voltage.

In another aspect, the time-base generator includes a calibration module for calibrating operation of the time of flight ranging system.

In a first aspect, the present invention provides time-base generator suitable for use in an echo ranging system, said time-base generator comprising: (a) a first pulse generator having an input for receiving an input signal and generating an output pulse train from said input signal; (b) a second pulse generator having an input for receiving a delayed signal and generating a delayed output pulse train, said delayed output pulse train having pulses with leading edges delayed from pulses in said output pulse train; (c) a delay stage coupled to the input of said second pulse generator, said delay stage having an input for receiving said input signal and an output coupled to the input of said second pulse generator for outputting said delayed signal, and said delay stage including a control input for varying the delay in said delayed signal in response to a delay control signal; (d) a control loop having an input port and output port, said output port being coupled to the outputs for said first and said second pulse generators, and said control loop having an output port coupled to the control input of said delay stage for outputting said delay control signal; and (e) a references voltage module having one or more components for setting reference voltage outputs, and said references voltage outputs providing a temperature independent effect for components in said first and said second pulse generators and in said delay stage and said control loop.

In a second aspect, the present invention provides a method for calibrating a level measurement system, the level measurement system including a transmit module, a receive module, a transducer, and a controller, the transmit module is responsive to the controller to generate transmit pulses from the transducer, and the receive module is responsive to echo signals received from the transducer for processing by the controller to generate an echo profile, said method comprising the steps of: (a) providing a first reflective surface at a first distance from the transducer; (b) providing a second reflective surface at a second distance from the transducer, and said second reflective surface being movable to provide an unobstructed path between said first reflective surface and the transducer; (c) generating one or more pulses directed at said second reflective surface and taking time of flight measurements for pulses reflected by said second reflective surface; (d) moving said second reflective surface to provide the unobstructed path to said first reflective surface; (e) generating one or more pulses directed at said first reflective surface and taking time of flight measurements for pulses reflected by said first reflective surface; (f) providing first and second calibration pulses; (g) using a sampling signal to determine an echo time for each of said calibration pulses; (h) determining a corresponding distance for each of said calibration pulses, said distances being based on said first and second distances, said time of flight measurements, and said echo times; (i) calibrating said sampling signal using the distances for each of said calibration pulses.

Other aspects and features of the present invention will become apparent to those ordinarily skilled in the art upon review of the following description of specific embodiments of the invention in conjunction with the accompanying drawings.

BRIEF DESCRIPTION OF THE DRAWINGS

Reference is next made to the accompanying drawings which show, by way of example, embodiments of the present invention and in which:

FIG. 3($b$) is a timing diagram showing the relationship between the ramp generator signals and the calibration signals;

FIG. 3($c$) shows in diagrammatic form apparatus for calibrating the time-base generator according to another aspect of the present invention;

FIG. 3($d$) is a timing diagram showing various waveforms for calibrating a time-base generator using the apparatus of FIG. 3($c$);

FIG. 3($e$) is a timing diagram showing the timing relationship between the echo profile for the receive calibration pulses and the ramp signal;

DETAILED DESCRIPTION OF EMBODIMENTS OF THE INVENTION

Figure 1:
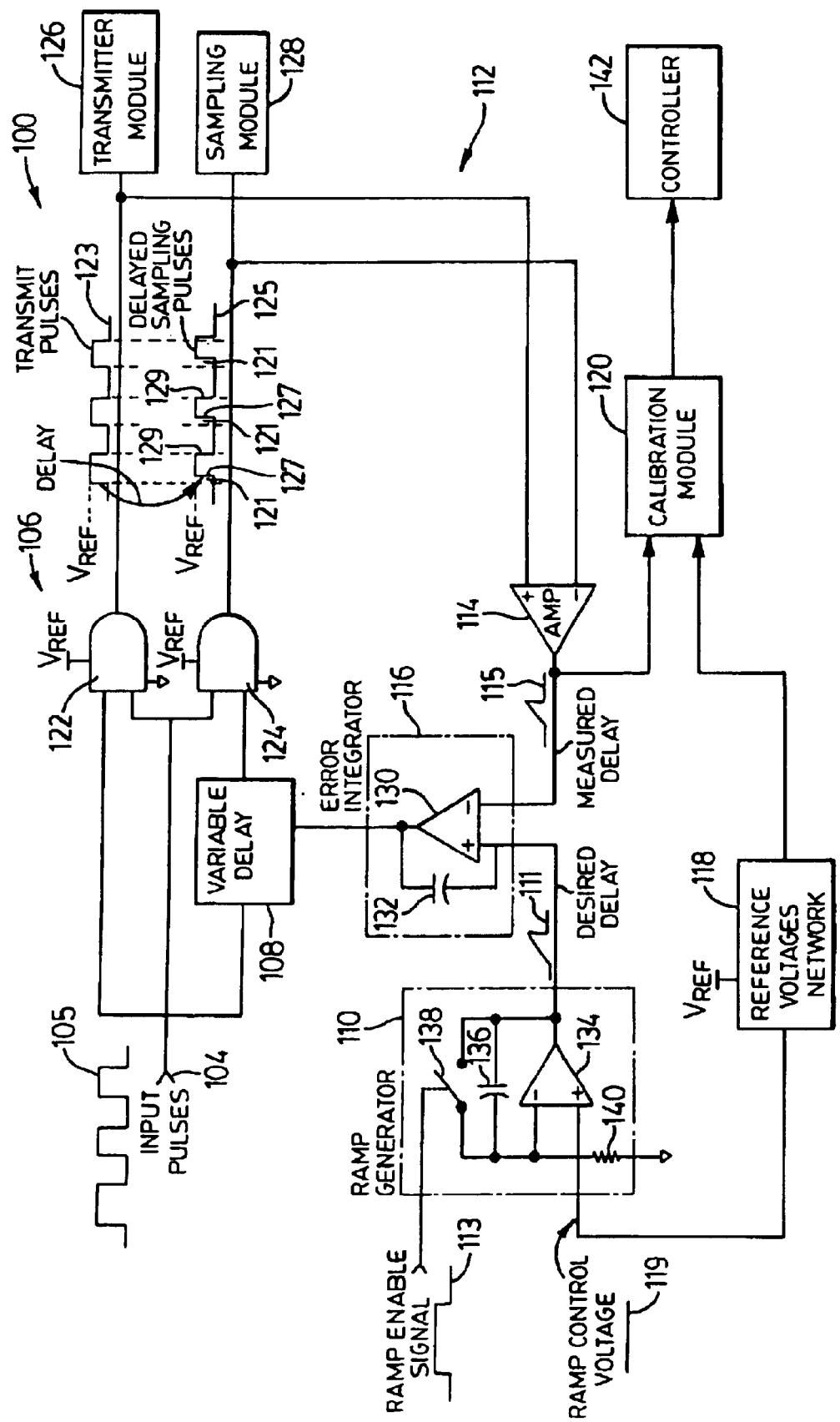
FIG. 1 shows in schematic form a time-base generator and control loop according to the present invention.

Reference is first made to FIG. 1 which shows in schematic form a time-base generator and compensating control loop according to the present invention. The time-base generator and control loop is indicated generally by reference 100. While the time-base generator 100 will be described in the context of time-of-flight or level measurement systems, it is to be appreciated that the invention is suitable for other applications.

Figure 2:
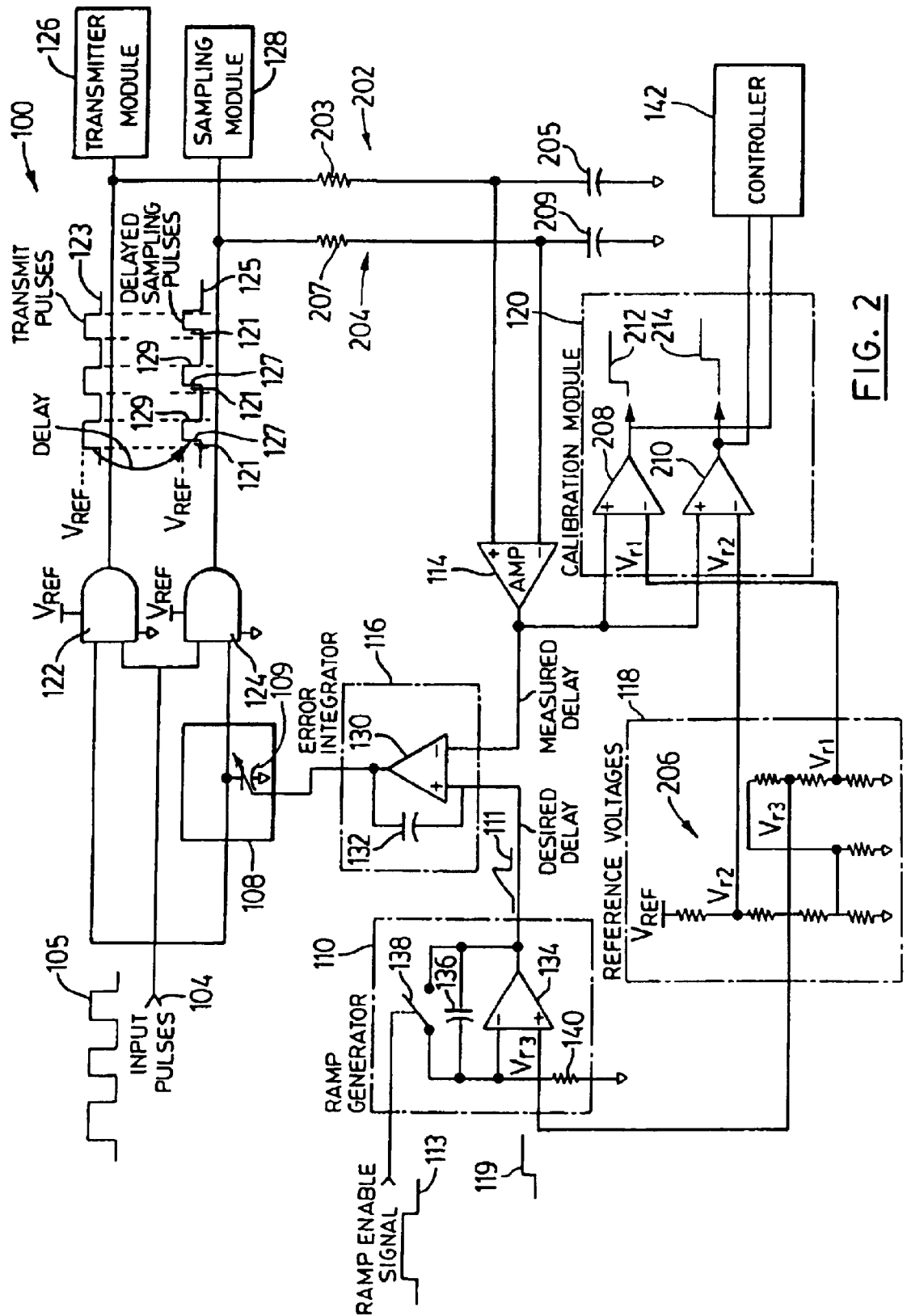
FIG. 2 is a schematic showing in more detail the time-base generator circuit of FIG. 1.

In FIGS. 1 and 2, like references indicate like elements.

As shown in FIG. 1, the time-base generator circuit 100 comprises a control loop indicated generally by reference 112. The time-base circuit 100 includes an input port 104, a pulse generation stage 106, a variable delay component 108, a ramp generator 110 and the self-compensating control loop 112. The self-compensating control loop 112 includes an amplifier 114, an error integrator 116, a reference voltages module 118, and a calibration module 120. The calibration module 120 is coupled to a controller 142 in a level measurement system or time-of-flight ranging system (not shown). As will be described in more detail below, the calibration module 120 generates calibration pulses which are used by the controller 142, for example, a microprocessor operating under firmware control, to calibrate the time-base generator 100.

As shown in FIG. 1, the pulse generation stage 106 comprises first 122 and second 124 logic AND gates. In a time-of-flight ranging or level measurement system (not shown), the output of the first AND gate 122 is coupled to a transmit module 126. The output of the second AND gate 124 is coupled to a receive module 128 in the level measurement system. These and other elements of the level measurement system are within the understanding of one skilled in the art. The input port 104 receives an input pulse train or signal indicated by reference 105. The input pulse signal 105 is applied to the input of the first logic AND gate 122 and a transmit pulse train or signal indicated by reference 123 is generated. The input pulse signal 105 is also applied to the input of the second AND gate 124 through the variable delay component 108 to generate a delayed pulse signal 125. The delayed pulse signal 125 is characterized by pulses having leading edges 127 which are delayed from the leading edges of the transmit pulse signal 123, and trailing edges 129 which are coincident with the trailing edges in the transmit pulse signal 123. In FIGS. 1 and 2, the delay between the leading edges of the transmit pulse signal 123 and the sampling signal 125 is indicated by reference 121.

As shown in FIG. 1, the transmit pulse signal 123 is outputted to the transmitter module 126 in the level measurement system. The transmitter module 126 uses the transmit pulse signal 123 to generate output radar pulses. The output radar pulses are directed at a target, for example in a level measurement system application, a liquid or material surface contained in a vessel. The output radar pulses are reflected and directed back as echo signals to the receive module in the level measurement system. The receiver module includes the sampling module 128 and using the delayed pulse signal 125 in an equivalent time sampling arrangement the received echo pulses are sampled and an echo pulse profile is generated. The echo pulse profile is then used to determine the distance to the target, i.e. the surface of the liquid contained in a vessel for a level measurement system.

As will now be described in more detail below, the delay between the leading edges 127 of the delayed pulse signal 125 and the transmit pulse signal 123 is maintained by the control loop 112. Maintaining an accurate delay is critical for the equivalent time sampling process.

Referring to FIG. 1, the transmit pulse signal 123 and the delayed pulse signal 125 are fed into the amplifier 114 which comprises a differential amplifier component. As shown in FIG. 2, the transmit pulse signal 123 is averaged by a low pass filter 202 comprising a resistor 203 and a capacitor 205. Similarly, the delayed pulse signal 125 is averaged by another low pass filter 204, also comprising a resistor 207 and a capacitor 209. In this way, the differential amplifier 114 responds to the average duty cycles of the transmit pulse signal 123 and the delayed pulse signal 125, respectively. The differential amplifier 114 outputs a signal 115 which represents the measured delay between the transmit pulse signal 123 and the delayed pulse signal 125. The measured delay output 115 from the differential amplifier 114 is fed to one input of the error integrator 116. The error integrator 116 comprises a differential amplifier component 130 and a capacitor 132 configured in known manner to perform the error integration function and generate an output signal which adjusts the variable delay component 108.

As shown in FIGS. 1 and 2, the other input of the error integrator 116 is coupled to the output of the ramp generator 110. The ramp generator 110 generates a ramp sweep signal 111 which is used to sweep or slew a time sampling window for sampling detectable pulses in the receive echo signal or pulse train. The ramp generator 110 comprises a differential amplifier 134, a capacitor 136, a control switch 138 and a resistor 140 configured to generate the ramp sweep signal 111. A ramp enable signal 113 is applied to the control switch 138 and enables the generation of the ramp sweep signal 111. As also shown in FIG. 1, a ramp control voltage 119 is applied to the other input of the differential amplifier 134. The ramp control voltage 119 is generated by the references voltage network 118 as will be described in more detail below. The logic gates 122 and 124 and the reference voltages network 118 are supplied by a reference voltage supply $V_{REF}$.

The error integrator 116, specifically, the differential amplifier 130 takes the difference between the ramp sweep signal 111 and the measured delay signal 115. This difference is integrated by the error integrator 116 and the resulting output is applied to the variable delay 108. As shown in FIG. 2, the variable delay 108 comprises a variable capacitor 109 which is coupled between the input port 104 and one input of the second logic AND gate 124. The variable capacitor 109 serves to delay the input pulses 105 applied to the input port 104. A variable voltage delay component may also be utilized to provide the desired delay.

Referring to FIG. 2, the references voltage module 118 comprises a resistor divider network 206. The resistor divider network 206 is configured to generate reference voltages $V_{r1}$, $V_{r2}$, and $V_{r3}$. As will be described in more detail below, the reference voltages $V_{r1}$ and $V_{r2}$ are utilized by the calibration module 120. The reference voltage $V_{r3}$ provides the reference voltage for the ramp control voltage 119 which is applied to the ramp generator 110.

Referring again to FIG. 2, the calibration module 120 comprises first 208 and second 210 comparators. The reference voltage for the first comparator 208 is the voltage $V_{r1}$ established by a branch in the resistor divider network 206. The reference voltage for the second comparator 210 is the voltage $V_{r2}$ which is established by another branch in the resistor divider network 206. As shown in FIG. 2, the measured delay voltage output signal 115 from the amplifier 114 is applied to each of the comparators 208 and 210 and compared against the respective reference voltage $V_{r1}$ or $V_{r2}$. The first comparator 208 generates a first calibration output signal 212, and the second comparator 210 generates a second calibration output signal 214. As will be described in more detail below, the first 210 and second 212 calibration output signals are used to calibrate the time-base generator 100.

Figure 3A:
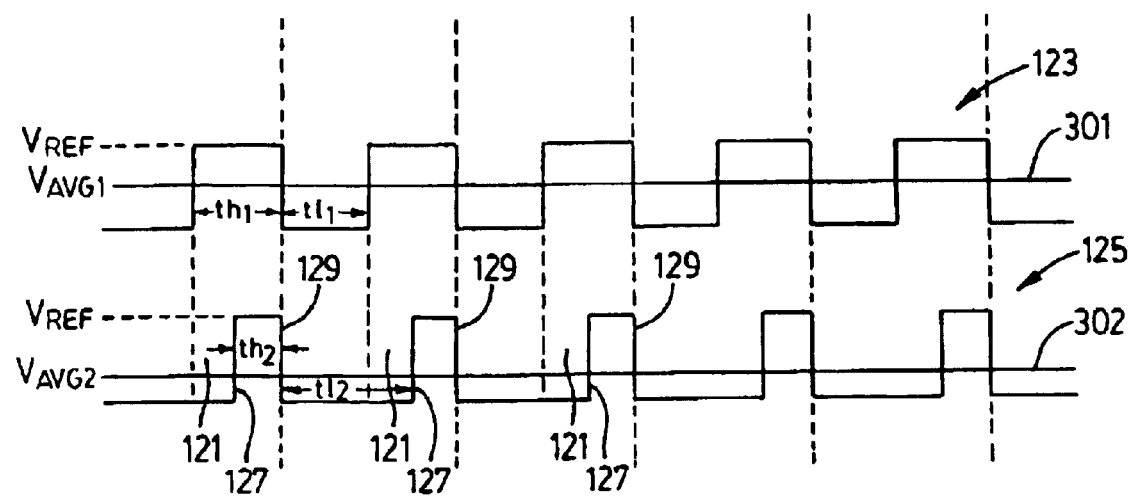
FIG. 3($a$) is a timing diagram showing the relationship between the transmit pulse train or signal and the delayed sampling pulse signal and their respective average or integrated values.

As described above, the delay 121 between the transmit pulse signal 123 and the delayed pulse sampling signal 125 is measured by synchronizing the falling edges and delaying the leading edges 127 of the delayed pulse sampling signal 125. The difference between the leading edges defines the delay 121. As a result, the pulse widths for the transmit pulse signal 123 and the sampling pulse signal 125 will be different, and the average values will also be different. It will be appreciated that while the average values for signals are different, the difference is proportional to the difference in the pulse widths. Referring to FIG. 3(a), integrating the transmit pulse signal 123 gives a transmit pulse averaged signal 301 having an amplitude of $V_{AVG1}$. Similarly, integrating the delayed sampling pulse signal 125 gives a delayed sampling pulse averaged signal 302 having an amplitude of $V_{AVG2}$. Using this approach, it is important to accurately control the amplitude of the pulse widths for the transmit 123 and the sampling 125 signals.

Referring still to FIG. 3(a), for the transmit pulse signal 123, the average value 301 is given by the following equation:

$$V_{AVG1}=V_{REF}\times t_{h1}/(t_{h1}+t_{l1})$$

Similarly, for the sampling pulse signal 125, the average value 302 is given by the following equation:

$$V_{AVG2}=V_{REF}\times t_{h2}/(t_{h2}+t_{l2})$$

If the frequency F is represented by the term $1/(t_h+t_l)$, then the averaged values are determined as follows:

$$V_{AVG1}=V_{REF}\times t_{h1}\times F$$

$$V_{AVG2}=V_{REF}\times t_{h2}\times F$$

The difference between the average values (which is proportional to the measured delay) is given as follows:

$$V_{AVG1}-V_{AVG2}=V_{REF}\times F(t_{h1}-t_{h2})$$

Figure 4:
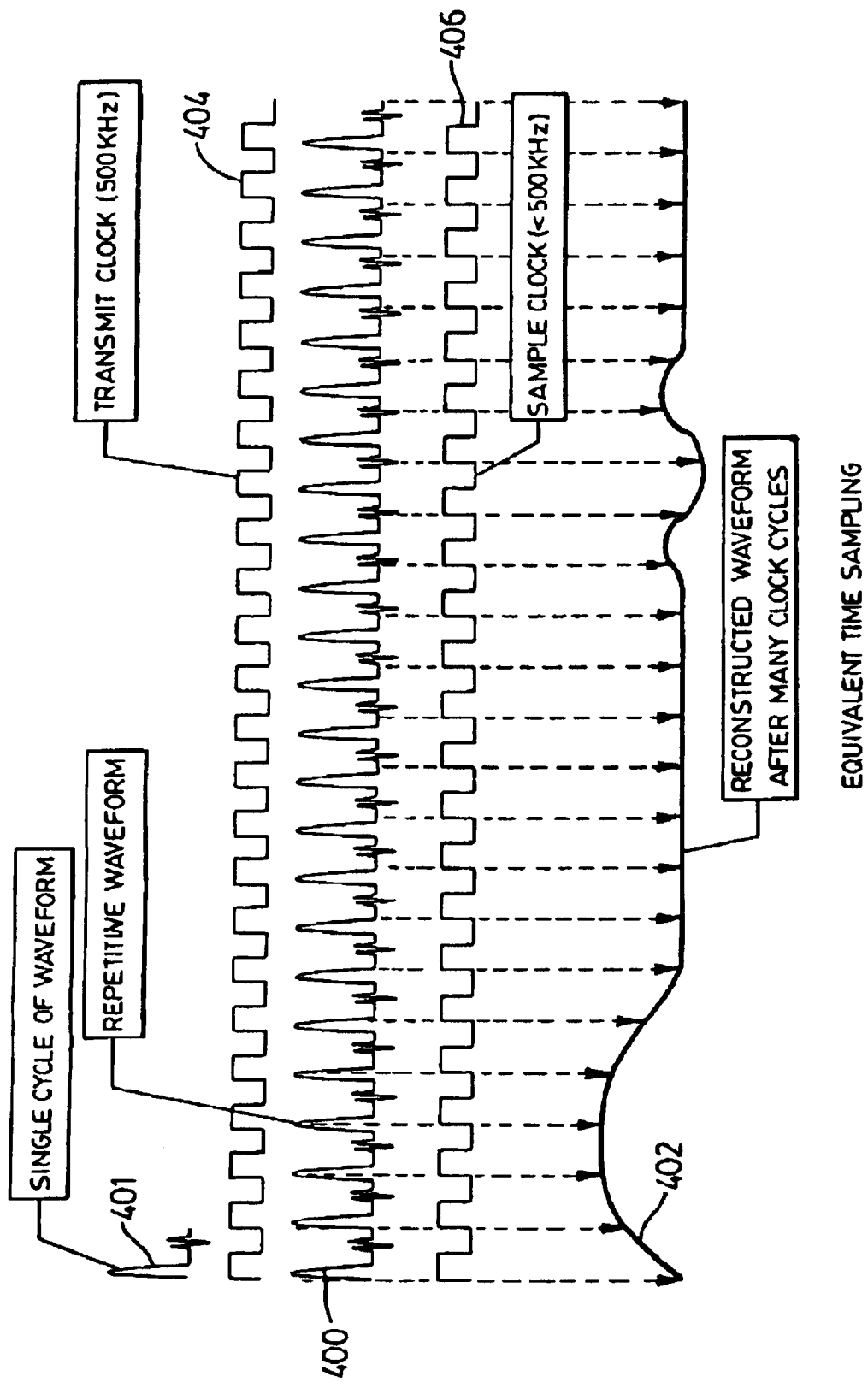
FIG. 4 is a timing diagram showing the reconstruction of a cycle of repetitive waveform using the equivalent time sampling technique.

This means that the instant at which the real time signal (e.g. the waveform 400 in FIG. 4) is sampled is given by the following equation (1):

$$(t_{h1}-t_{h2})=(V_{AVG1}-V_{AVG2})/(V_{REF}\times F)$$

For the arrangement shown in FIGS. 1 and 2 and described above, the ramp signal 111 is used to sweep the sampling instant or window along the real time signal 400. For the non-inverting ramp generator 110, this is defined as follows:

$$V_{ramp}=V_{REF}\times D\times T/(R\times C)$$

Where:
  $V_{REF}$ is a reference voltage
  D is a voltage divider ratio
  T is the time since the ramp started
  C is the value for the ramp capacitor 136 (FIG. 1)
  R is the value for the ramp resistor 140 (FIG. 1)

The desired delay between the transmit pulse signal 123 and the sampling pulse signal 125 is represented by dt. The control loop 112 forces the measured delay 121 given by equation (1) above to follow the desired delay dt and may be represented by the following equation (2):

$$dt=(V_{AVG1}-V_{AVG2})/(V_{REF}\times F)$$

By adding a gain factor A of the amplifier 114 and rearranging equation (2), the following equation (3) is given:

$$V_{(measured\ delay)}=A\times dt\times V_{REF}\times F$$

The control loop 112 sets the measured delay voltage $V_{(measured\ delay)}$ to the desired delay voltage or $V_{(desired\ delay)}$ and combining and rearranging equations (2) and (3) defines the desired delay as follows in equation (5):

$$dt=D\times T/(R\times C\times A\times F)$$

It will be appreciated from resulting equation (5) that the reference voltage $V_{REF}$ has been eliminated which means that the temperature variation resulting from drift in the voltage supply is also eliminated.

In the implementation of the system, it is important to use stable components for the variables defined by equation (5). The amplifier 114 defines the gain A in equation (5) and the resistor divider network 206 defines the division ration D in equation (5). A suitable component for the amplifier 114 is an instrumentation amplifier with a fixed gain, and such devices are commercially available with 4 ppm/C gain drift and 0.4 µV/C input offset voltage drift with a gain (i.e. A) of 10. To achieve stable voltage divider ratios, the resistor divider network 206 is implemented using thin film resistors (for example in a single package) which track each other in the range ±5 ppm/C. It will be appreciated that the capability to track temperature variations in the resistor elements comprising the resistor divider network 206 is more critical than the exact divider ratios. The frequency F is generated using a crystal controlled oscillator which provides a temperature stable time reference.

The remaining variables in equation (5) are resistance R and capacitance C. The resistance R is set by the resistor 140 in the ramp generator 110, and the capacitance C is set by the capacitor 136 also in the circuit for the ramp generator 110. It will be appreciated that the resistor 140 and the capacitor 136 define the slope of the ramp signal 111 and any change in these values, for example due to temperature variation, will change the slope of the ramp signal 111 which in turn will affect the sweep of the sampling window and therefore the sampling of the signal.

To overcome the temperature drift associated with the components for the resistor 140 and capacitor 136 and the resulting effect on the generation of the ramp signal 111, a time calibration technique is provided according to another aspect of the invention. As described above with reference to FIG. 2, the time-base generator 100 includes the calibration module 120, which generates two calibration signals 212 and 214 based on reference voltages $V_{r1}$ and $V_{r2}$. The calibration signals 212 and 214 are used by the controller 142 (e.g. in the level measurement system) to calibrate the ramp generator 110 and the ramp signal 111. The ramp signals 111 and 117, and the calibration signals 212 and 214 are shown in more detail in FIG. 3(b).

Figure 3B:
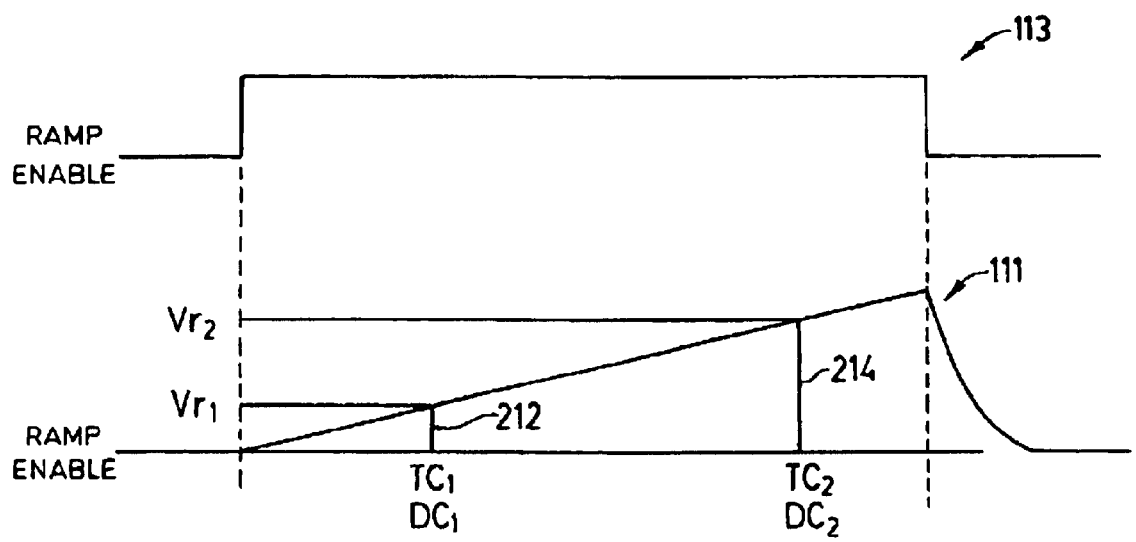

As shown in FIG. 3(b), the calibration signals 212 and 214 corresponding to $V_{r1}$ and $V_{r2}$ and define calibration points 215 and 217, respectively, at distances in real time. The calibration points can be considered to be directly related to the pulse width, i.e. $t_{h1}$ and $t_{h2}$, as they are derived from the same reference voltage $V_{REF}$ which is applied to the resistor divider network 206.

Figure 3C:
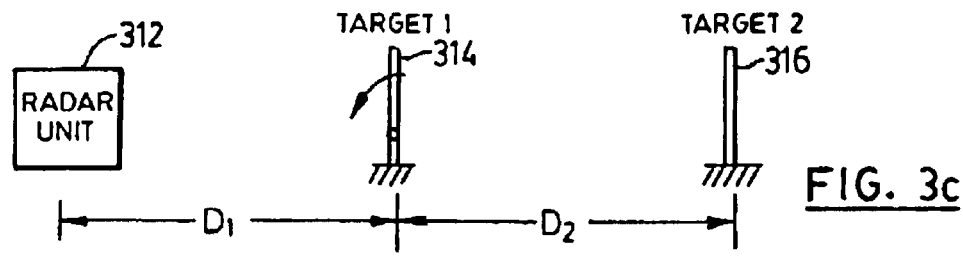
Figure 3D:
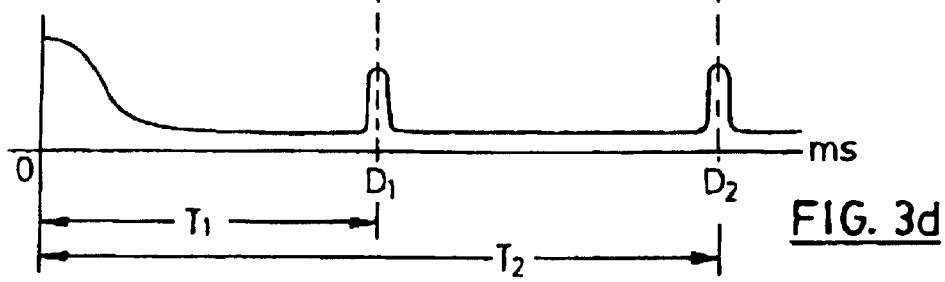

Reference is next made to FIGS. 3(c) and 3(d) to describe a calibration procedure for determining real time or actual physical distances corresponding to the calibration points 215 and 217. The actual physical distances are determined during manufacturing using an arrangement as shown in FIG. 3(c) comprising a radar-based level measurement unit 312, a first target (i.e. reflective surface) 314, and a second target 316. The first target 314 is placed at a known distance d1 and comprises a target which can be flipped down to provide a transmission/echo path between the level measurement unit 312 and the second target 316. The second target 316 is placed at a known distance D2 from the first target 314. The distances D1 and D2 may be determined, for example, using precision laser range finder. The next step in the calibration process involves determining the pulse echo travel times T1 and T2 for the first and second targets 314 and 316, respectively. The travel times T1 and T2 are determined by the controller 142 which generates transmit pulses for the first 314 and second 316 targets and determines the respective travel times T1 and T2 based on the echo pulses received from the respective targets 314 and 316. The calibration points 212 and 214 also have a respective echo time associated with them which is determined from the slope of the ramp signal 111, as shown in FIG. 3(b). Following these calibration steps, the following parameters are known:

D1, D2, T1, T2 and Tc1, Tc2

Using the measured/known values for these parameters, the values for the calibration point distances Dc1 and Dc2 can be determined using algebraic manipulation of two equations incorporating these parameters. The values for the calibration point distances Dc1 and Dc2 should be calculated before there is a change in temperature which could affect the drift of the components and result in a change in the slope of the ramp signal 111.

It will be appreciated that during the calibration procedure, the distance between and to the calibration pulses Vr1 and Vr2, i.e. the calibration distances Dc1 and Dc2, is based on known distances, which are derived from the measured distances D1 and D2. This means that even if the slope of the ramp signal 111 changes, the distance between and to the calibration pulses Vr1 and Vr2 remains constant. By updating the travel time measurements Tc1 and Tc2, the new slope for the ramp signal 111 can be recalculated. This in turn allows accurate measurements of the velocity for the echo (i.e. receive) pulses to be made, and subsequent level measurement calculations to be made.

Figure 3E:
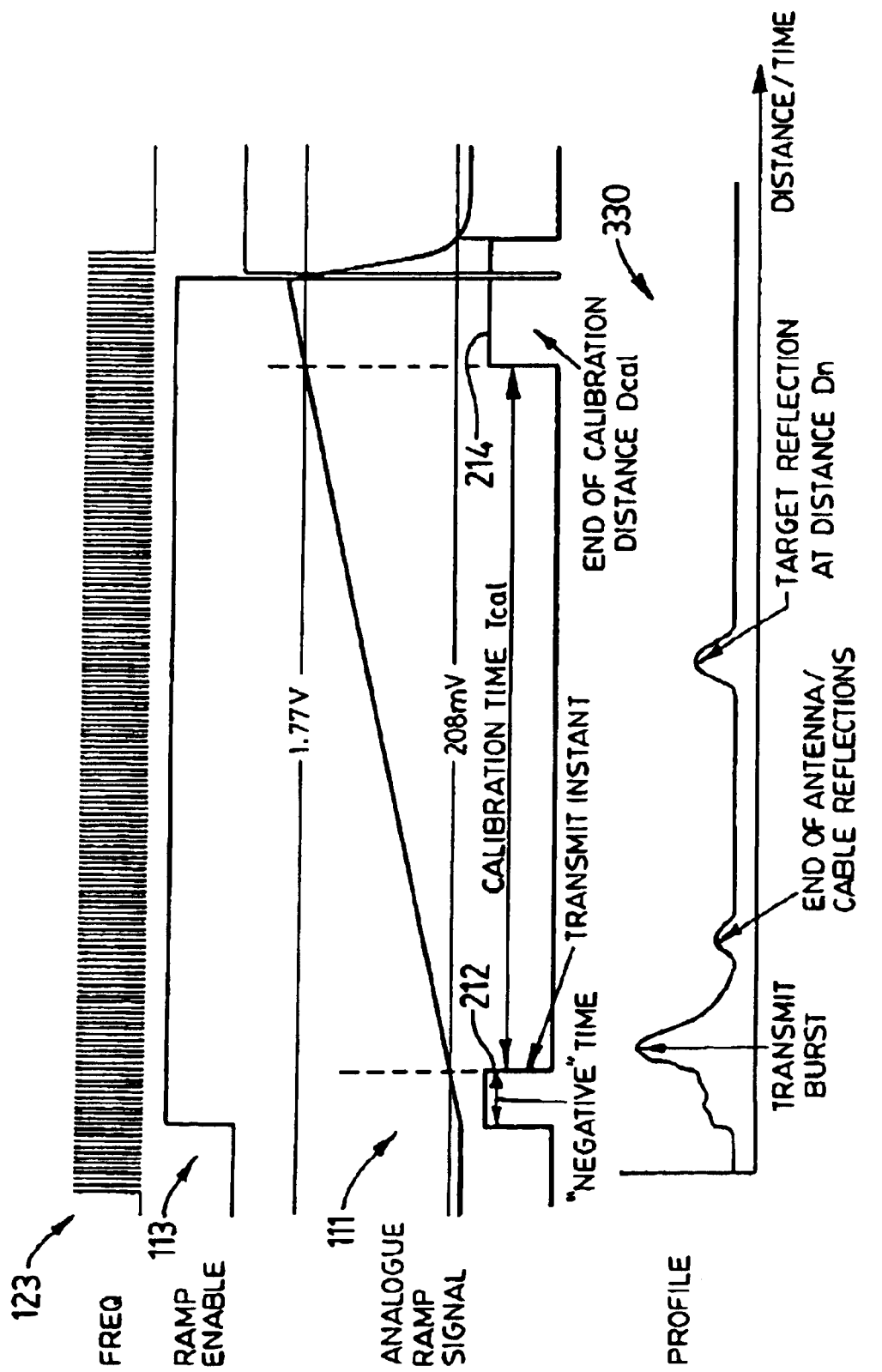

The relationship between the ramp signal 111, the calibration pulses 212, 214 and the resulting echo profile 330 showing the echo pulse 332 for the calibration distance is illustrated in FIG. 3(e).

It is noted that the calibration module 120 could also use the desired delay (i.e. ramp signal) 111 instead of the measured delay signal 115 because the ramp signal 111 and the measured delay signal 115 are virtually identical when the control loop 112 is operating correctly. As described above, the difference between the desired delay, i.e. the ramp signal 111, and the measured delay signal 115 are fed into the error integrator 116.

The present invention may be embodied in other specific forms without departing from the spirit or essential characteristics thereof. Certain adaptations and modifications of the invention will be obvious to those skilled in the art. Therefore, the above discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A time-base generator suitable for use in an echo ranging system, said time-base generator comprising:
   (a) a first pulse generator having an input for receiving an input signal and generating an output pulse train from said input signal;
   (b) a second pulse generator having an input for receiving a delayed signal and generating a delayed output pulse train, said delayed output pulse train having pulses with leading edges delayed from pulses in said output pulse train;
   (c) a delay stage coupled to the input of said second pulse generator, said delay stage having an input for receiving said input signal and an output coupled to the input of said second pulse generator for outputting said delayed signal, and said delay stage including a control input for varying the delay in said delayed signal in response to a delay control signal;
   (d) a control loop having an input port and output port, said output port being coupled to the outputs for said first and said second pulse generators, and said control loop having an output port coupled to the control input of said delay stage for outputting said delay control signal; and
   (e) a references voltage module having one or more components for setting reference voltage outputs, and said references voltage outputs providing a temperature independent effect for components in said first and said second pulse generators and in said delay stage and said control loop.

2. The time-base generator as claimed in claim 1, wherein said control loop includes a differencing amplifier, an error integrator, and a ramp generator, said differencing amplifier having a first input for receiving said output pulse train and a second input for receiving said delayed output pulse train, said ramp generator having an input for receiving a reference voltage from said references voltage module and an output coupled to an input on said error integrator for outputting a ramp signal, and said error integrator having another input for receiving the output from said differencing amplifier, and said error integrator being responsive to said input signals to generate a delay control signal for output to said delay stage.

3. The time-base generator as claimed in claim 2, further including a calibration module, said calibration module having an input coupled to the output of said differencing amplifier and an input port coupled to said reference voltages module for receiving a plurality of reference voltage outputs, and said calibration module including circuitry for generating calibration pulses and an output port for outputting said calibration pulses to a controller.

4. The time-base generator as claimed in claim 3, wherein said circuitry comprises first and second comparators, said first comparator having an input coupled to the output of said differencing amplifier and another input coupled to said reference voltages module for receiving a first reference voltage, and said second comparator having an input also coupled to the output of said differencing amplifier and another input coupled to said reference voltages module for receiving a second reference voltage, and in response to said inputs said first comparator generating a first calibration output signal, and said second comparator generating a second calibration output signal.

5. The time-base generator as claimed in claim 4, wherein said first calibration output signal corresponds to a first echo distance for an echo ranging system, and said calibration output signal corresponds to a second echo distance for the echo ranging system, and said controller includes a component for determining a time of flight measurements for each of said calibration output signals, and said controller including another component for determining a velocity calculation for echo ranging system based on said time of flight measurements and said first echo and said second echo distances.

6. A method for calibrating a level measurement system, the level measurement system including a transmit module, a receive module, a transducer, and a controller, the transmit module is responsive to the controller to generate transmit pulses from the transducer, and the receive module is responsive to echo signals received from the transducer for processing by the controller to generate an echo profile, said method comprising the steps of:

(a) providing a first reflective surface at a first distance from the transducer;

(b) providing a second reflective surface at a second distance from the transducer, and said second reflective surface being movable to provide an unobstructed path between said first reflective surface and the transducer;

(c) generating one or more pulses directed at said second reflective surface and taking time of flight measurements for pulses reflected by said second reflective surface;

(d) moving said second reflective surface to provide the unobstructed path to said first reflective surface;

(e) generating one or more pulses directed at said first reflective surface and taking time of flight measurements for pulses reflected by said first reflective surface;

(f) providing first and second calibration pulses;

(g) using a sampling signal to determine an echo time for each of said calibration pulses;

(h) determining a corresponding distance for each of said calibration pulses, said distances being based on said first and second distances, said time of flight measurements, and said echo times;

(i) calibrating said sampling signal using the distances for each of said calibration pulses.

7. The method as claimed in claim 6, wherein said sampling signal comprises a ramp signal having a slope, and said slope corresponds to the velocity of said echo pulses.

8. The method as claimed in claim 6, wherein said step (i) comprises taking a new echo time for each of said calibration pulses, and using the distances for each of said calibration pulses, calculating a velocity for the calibration pulses, and said velocity providing an indication of any change in the sampling signal due to drift.

9. The method as claimed in claim 8, wherein said sampling signal is subject is temperature drift attributable to electronic circuitry in the level measurement system.

10. The method as claimed in claim 7, wherein said step (i) comprises using the slope of said ramp signal and intersection points to determine a new echo time for each of said calibration pulses, and using said new echo times and said distances to calculate a velocity, said velocity corresponding to the slope of said ramp signal.

11. The method as claimed in claim 10, wherein the slope of said ramp signal is subject is temperature drift attributable to electronic circuitry in the level measurement system.

12. The method as claimed in claim 11, wherein said step (h) of determining a corresponding distance for each of said calibration pulses, said distances being based on said first and second distances, said time of flight measurements, and said echo times is performed under a stable temperature condition.

* * * * *